April 22, 1969     W. E. POULOS     3,440,641

INDICATING DEVICE

Filed Sept. 23, 1966

INVENTOR
WILLIAM E. POULOS

*Newton, Hopkins,
Jones & Ormsby*

ATTORNEYS

United States Patent Office 3,440,641
Patented Apr. 22, 1969

3,440,641
INDICATING DEVICE
William E. Poulos, 533 Clairmont Circle, #1,
Decatur, Ga. 30033
Filed Sept. 23, 1966, Ser. No. 581,574
Int. Cl. G08b 5/22; H04m 11/02
U.S. Cl. 340—332                    10 Claims

ABSTRACT OF THE DISCLOSURE

A signalling device comprising three sets of a plurality of switches and remotely located therefrom a plurality of indicator lamps. Actuation of a combination of one switch from each set will operate a partcular indicator lamp. Each remote indicator lamp has a corresponding switch at the remote location which deactivates the indicator lamp.

---

This invention relates to indicating devices and more particularly to an indicating device for visually indicating a particular combination of a plurality of selections.

There is a frequent requirement in the communication or signalling art for an indicating device which will visually indicate that a particular combination of a plurality of selections has been made. For example, various attempts have been made in the prior art to provide an indicating device for indicating in the kitchen of a restaurant the food items ordered by a customer at a table by using a selector unit at the table operatively connected to a display unit in the kitchen. A difficulty with prior art indicating devices when used in applications such as this is that they have frequently required a separate indication of each selection. Thus, they have generally required either a relatively large amount of electrical circuitry between a selector unit and a display unit or relatively complex electrical circuitry to provide for selection sequencing. This has resulted in prior indicating devices being relatively expensive to manufacture and install.

Moreover, most prior art indicating devices when used in such applications have been generally unreliable and susceptible to operating errors. In addition, few prior art indicating devices have effectively organized a plurality of selections to provide a single visual indication so as to efficiently and effectually present a plurality of selections with an indicating device requiring a minimum of space.

There are these and other difficulties encountered with prior indicating devices which are eliminated by the invention disclosed herein. This is because the invention provides an indicating device which visually indicates a particular combination of a plurality of selections with a single visual indication so as to effectively indicate the plurality of selections in a minimum of space. Moreover, the invention provides an indicating device in which a selector unit is operatively connected to the display unit with a minimum of electrical circuitry and in which no complex electrical circuitry is required for the sequencing of selections. Thus, the indicating device of the invention is relatively inexpensive to manufacture and install.

In addition, the indicating device provided by the invention is highly reliable and not susceptible to operating error. This is not only because it is responsive only to a particular combination of selections but also because once a particular combination of selections has been made to provide a visual indication, the indicating device remains operative to provide the visual indication until it is rendered inoperative in a manner wholly unrelated to any combination of selections.

These improvements in an indicating device are provided by an indicating device including an indicating circuit having a neon lamp which is ignited only upon the existence of a particular combination of three voltage conditions in the indicating circuit. The indicating device may include one or a plurality of these indicating circuits and when a plurality of indicating circuits is used, the indicating circuits are arranged to form a matrix so that the three voltage conditions required for ignition of a neon lamp in an indicating circuit are selectively provided in the plurality of indicating circuits forming the matrix. However, whether a single indicating circuit or a matrix of indicating circuits is included in the indicating device, the indicating device is well suited to applications requiring a selector unit remote from a display unit.

These and other features and advantages of the invention will be more clearly understood from the following detailed description and the accompanying drawings in which like characters of reference designate corresponding parts throughout and in which.

These figures and the following detailed description disclose a specific embodiment of the invention but the invention is not limited to the details disclosed since it may be embodied in other equivalent forms.

Figure 3:
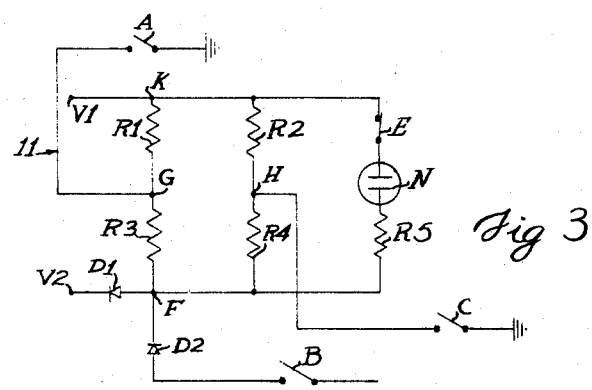
FIG. 3 is a schematic circuit diagram of the indicating circuit of an indicating device embodying the invention disclosed herein.

The indicating device 10 disclosed herein can be best understood in terms of an indicating circuit 11 responsive to three voltage conditions. The indicating circuit 11 is best shown in FIG. 3 where it will be seen that it comprises three circuit branches in parallel. The first circuit branch includes the resistor R1 and the resistor R3 in series; the second circuit branch includes the resistor R2 and the resistor R4 in series; and the third circuit branch includes the resistor R5, the neon lamp N, and the switch E in series.

The indicating circuit 11 is connected to a voltage V1 at point K and to a voltage V2 at point F through the diode D1 which is arranged for current flow only toward the voltage V2. At point G between the resistor R1 and the resistor R3, the indicating circuit 11 is connected to ground through a switch A and at point H between the resistor R2 and the resistor R4, the indicating circuit 11 is connected to ground through a switch C. The indicating circuit 11 is also connected at point F to the voltage V2 in parallel with the diode D1 through a switch B in series with a diode D2 arranged for current flow from the voltage V2.

The neon lamp N ignites to provide a visual indication of a particular combination of three voltage conditions at points F, G and H within the indicating circuit. The particular combination of three voltage conditions is determined by the positions of the switches A, B and C and this can be best understood by considering the voltage V1 as 118 volts and the voltage V2 as 28 volts and by considering the neon lamp N as having an igniting voltage of 98 volts, a cut-off voltage, once ignited, of 78 volts, and a holding voltage once ignited of 90 volts. For an understanding of the invention, no specific values need be assigned to the resistors R1, R2, R3, R4, and R5 if it is understood that the resistor R5 serves as current limiting resistor and that the resistors R1, R2, R3 and R4 are of equal value. Similarly, it should be understood that the switch E is closed.

With these specific values and characteristics assigned to the voltages V1 and V2, to the resistors R1, R2, R3, R4, and R5, and to the neon lamp N for purposes of illustration, the response of the indicating circuit to voltage conditions provided by the opening and closing of the switches A, B, and C will now be apparent to those skilled in the art. For example, with the switches A, B, and C all open, the voltage across the neon lamp N is the voltage between points K and F which is the difference between the voltages V1 and V2 or approximately 90 volts. This voltage is not sufficient to cause the neon lamp N to ignite.

The closing of the switch A with the switches B and C open causes the voltage across the resistor R1 and the voltage across the resistors R2, R4 and R3 in series to be in parallel between points K and G and to be V1 or 118 volts. This is because the diode D1 prevents current flow from the voltage V2 through the resistor R3. Since the neon lamp N is in parallel only with the resistors R2 and R4 between points K and F and since the voltage across the resistors R2 and R4 is only two-thirds of the voltage between points K and G, the voltage across the neon lamp N is only approximately 80 volts with switch A closed and switches B and C open. This voltage is insufficient to cause the ignition of the neon lamp N.

The closing of the switch C with the switches A and B open causes a voltage across the neon lamp N similar to that caused by the closing of the switch A with the switches B and C open. This is because the voltage V1 is now across the resistor R2 between points K and H and in parallel with resistors R1, R3 and R4 in series and because the voltage across the neon lamp N is once again only the voltage between points K and F or two-thirds of the voltage V1. This voltage is not sufficient to ignite the lamp N.

The closing of the switch B with the switches A and C open does not alter the voltage across the neon lamp N since current continues to flow from the voltage V1 to the voltage V2 through the diode D1 and cannot flow to the voltage V2 through the switch B because of the diode D2. Thus, the closing of the switch B does not provide a voltage across the neon lamp N between points K and F which is sufficient to ignite the neon lamp N.

However, with the switch A closed and the switch C open, the closing of the switch B results in the voltage across the resistor R1 being V1 volts because of the flow of current from V1 to point G and the voltage across the resistor R3 being V2 because of the flow of current from V2 to point G through switch B, but since the voltages across the resistors R1 and R3 are of opposite polarity, the voltage across the neon lamp N between points K and F is only approximately 90 volts which is once again not sufficient to ignite the neon lamp N. Moreover, it will be understood that the closing of the switch B with the switch C closed and the switch A open or the closing of the switch B with both the switch A and the switch C closed causes a similar voltage across the neon lamp N which is not sufficient to ignite the neon lamp N. Thus, it will be seen that the closing of the switch A, the switch B or the switch C alone or the closing of the switch B with the switch A, the switch C, or both the switches A and C closed will not provide that combination of voltage conditions at points F, G, and H which is required for the the neon lamp N to ignite. This is because only the closing of both the switch A and the switch C with the switch B open that will cause the neon lamp N to ignite.

This can be seen by considering the indicating circuit 11 with both the switch A and the switch C closed and with the switch B open. With these positions of the switches A, B, and C, the voltage across the resistor R1 and the voltage across the resistor R2 in parallel is the voltage V1 and because of the diode D1 and the open position of the switch B, there is no current through and no voltage across the resistors R3 and R4 in parallel. Thus, the voltage V1 between points K and F is the voltage between points K and the points G and H. This voltage V1 or 118 volts is sufficient to cause the neon lamp N to ignite.

From the voltage conditions in the indicating circuit 11 described above for various combinations of positions for the switches A, B and C, it will be understood that there is no combination of positions for the switches A, B and C which provides a voltage between points K and F across the neon lamp N which is less than the cut-off voltage of the neon lamp N. Thus, once the neon lamp N has been ignited by closing the switches A and C with switch B open, the neon lamp N cannot be extinguished by any combination of positions for the switches A, B and C. However, the switch E in series with the neon lamp N extinguishes the neon lamp N when opened, and, once extinguished by the opening of the switch E, the neon lamp N remains extinguished until the switches A and C are once again closed with the switch B open.

Thus, the indicating circuit 11 provides for igniting a neon lamp N only in response to three voltage conditions as determined by a particular combination of the positions for the three switches A, B, and C and for the extinguishing of the neon lamp only upon the opening of the switch E. Moreover, it will now be understood that these three voltage conditions are the voltage conditions at points F, G, and H, which cause the points F, G, and H to have a common voltage so that the voltage between point K and both points G and H is the voltage between points K and F. The indicating circuit 11 will also be understood as a circuit in which the voltage across the neon lamp N is the difference between a larger voltage V1 and a smaller voltage V2 with certain positions for the switches A, B, and C; is a portion of the larger voltage V1 in certain positions for the switches A, B, and C; and is the larger voltage V1 only when three particular voltage conditions are provided by a particular combination of positions for the switches A, B, and C.

Therefore, it is necessary that the voltages V1 and V2 be selected so that the difference between the voltage V1 and the voltage V2 is less than the igniting voltage of the neon lamp N but greater than the cut-off voltage of the neon lamp N and that resistors R1, R2, R3, and R4 be selected so that the portion of the voltage V1 across the neon lamp N in certain positions for the switches A, B, and C is less than the igniting voltage of the neon lamp N but greater than the cut-off voltage of the neon lamp N. With only these limitations as to the voltages V1 and V2 and the resistors R1, R2, R3, and R4, the indicating circuit 11 provides an indicating device 10 which is selectively responsive to a particular combination of positions for the switches A, B, and C by the ignition of a neon lamp N and in which the neon lamp N can be extinguished only by the operation of a switch E.

Figure 1:
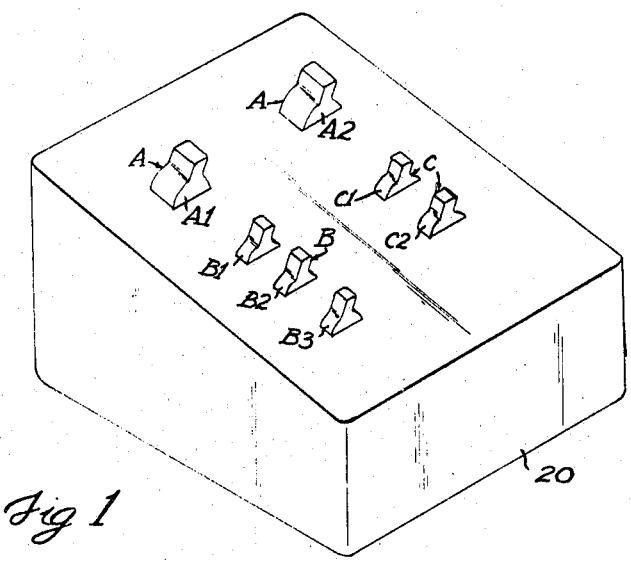
FIG. 1 is a perspective view of a selector station of an indicating device embodying the invention disclosed herein.
Figure 2:
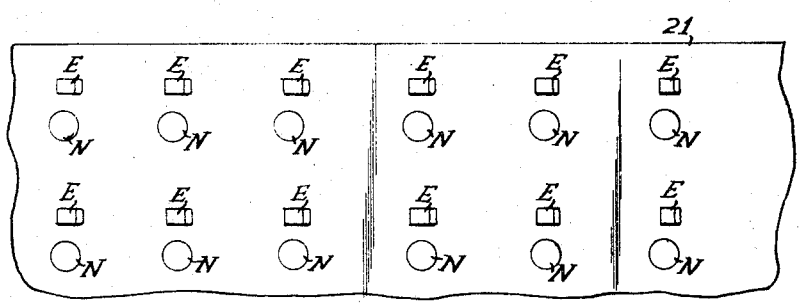
FIG. 2 is a partial front elevational view of a display unit of an indicating device embodying the invention disclosed herein.
Figure 4:
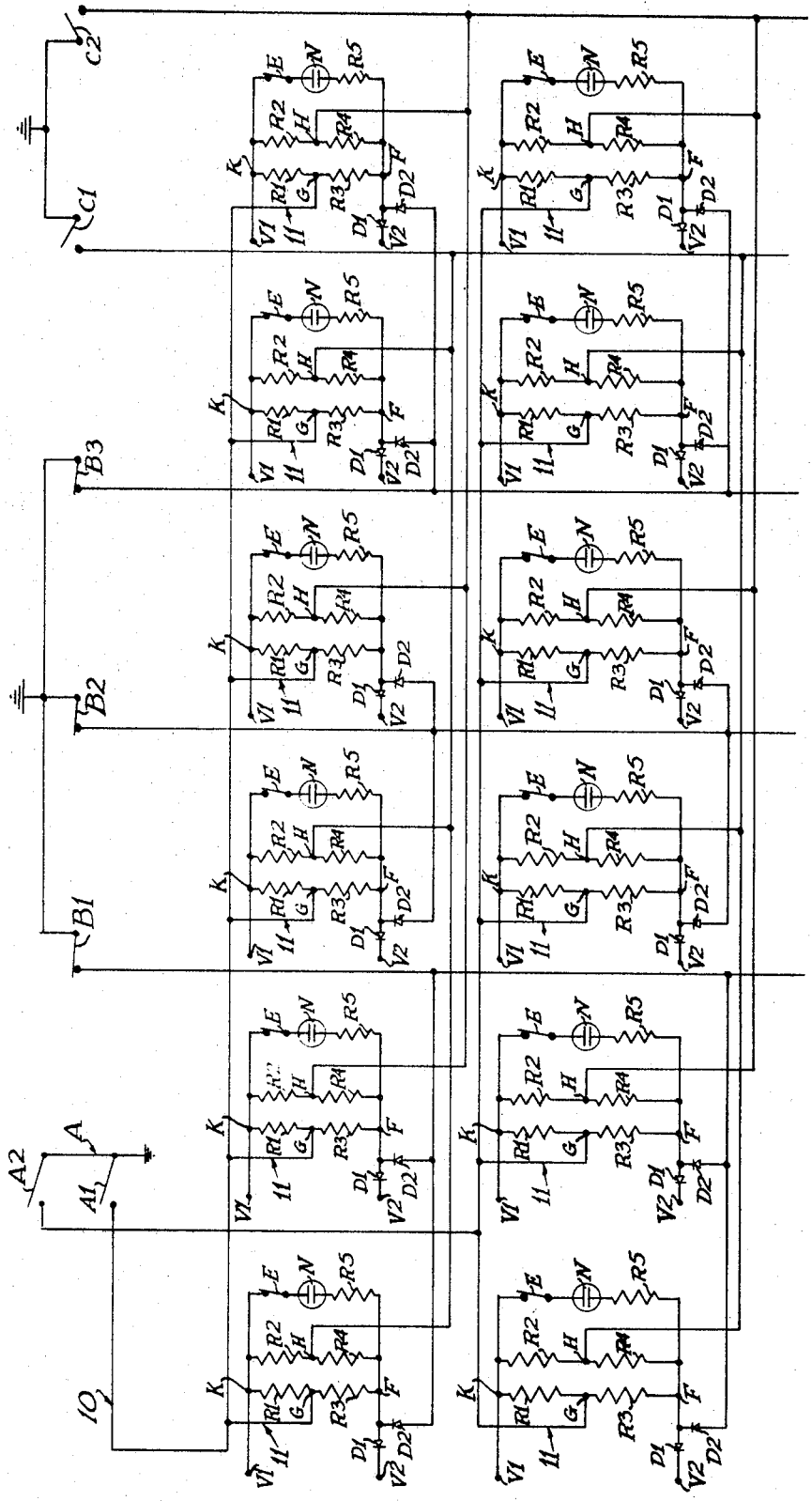
FIG. 4 is a schematic circuit diagram of a matrix of indicating circuits such as that shown in FIG. 3 arranged to provide an embodiment of the indicating device disclosed herein.

The indicating device may include one or a plurality of indicating circuits 11 and in that embodiment of the invention shown in FIGS. 1, 2, and 4, a plurality of indicating circuits 11 is used. When a plurality of indicating circuits 11 is used, the indicating circuits 11 are arranged in a matrix as shown in FIG. 4. From FIG. 4 it will be seen that the indicating circuits 11 in the upper row of the matrix have a common switch A which is designated as switch A1 and that the indicating circuits 11 in the second row of the matrix have a common switch A which is designated as switch A2. Similarly, it will be seen that the indicating circuits 11 in the first two columns of the matrix have a common switch B which is designated as switch B1, that the indicating circuits 11 in the second two columns of the matrix have a common switch B which is designated as B2, and that the indicating circuits 11 in the last two columns of the matrix have a common switch B which is designated as switch B3. In addition, the indicating circuits 11 in the first, third and fifth columns of the matrix have a common switch C which is designated as switch C1 and the indicating circuits in the second, fourth and sixth columns of the matrix have a common switch C which is designated as switch C2.

It will be understood that with this arrangement of a plurality of indicating circuits 11 in a matrix, the closing of a particular switch A1 or A2, the opening of a particular switch B1, B2, or B3, and the closing of a particular switch C1 or C2 will cause the ignition of only one neon lamp N in the entire matrix. For example, the closing of the switch A1, the opening of the switch B1 and the closing of the switch C1 will cause the ignition of only the neon lamp N in that indicating circuit 11 which is in the first row and the first column of the matrix. Moreover, this neon lamp N can be extinguished only by the operation of the switch E in series with it.

It will be understood by those skilled in the art that the arrangement and number of a plurality of indicating circuits 11 within a matrix and of a plurality of switches A, B, and C relative to the indicating circuits 11 may take many forms while still providing the selective response of a particular neon lamp N in a matrix to a particular combination of positions for a plurality of switches A, B, and C. It is this adaptability of the indicating circuit 11 which provides an indicating device 10 well adapted to a variety of applications. For example, in that embodiment of the invention shown in FIGS. 1, 2, and 4, a plurality of switches A, a plurality of switches B and a plurality of switches C are mounted in a selector unit 20 as shown in FIG. 1 and the matrix is positioned in a display unit 21 as shown in FIG. 2 so as to provide an indicating device 10 which permits the remote selection of a combination of food items by a customer in a restaurant.

With such an embodiment of the invention, the selector unit 20 is positioned at a table in the restaurant and the display unit 30 is positioned in the kitchen. Each switch A is associated with a particular food item such as meat, each switch B is associated with a particular food item such as a vegetable, and each switch C is associated with a particular food item such as a second vegetable.

Thus, a customer of the restaurant desiring to order a particular meat with two particular vegetables simply operates an appropriate switch A so as to close the switch A, the appropriate switch B so as to open the switch B, and the appropriate switch C so as to close the switch C. The result is that the neon lamp N corresponding to the particular switches A, B, and C operated by the customer is ignited in the display unit 30 positioned in the kitchen so that the order may be filled promptly. The lack of responsiveness of the indicating device 10 to handling of the switches A, B, and C once they have been operated and the fact that the neon lamp N may be extinguished only by the operation of a switch E in the display unit 30 serve to insure that the indication of the food items selected by the customer is not inadvertently extinguished until the order is filled.

What is claimed as invention is:

1. In an indicating device for indicating a particular combination of positions for a first switch, second switch, and third switch by the ignition of a neon lamp having an ignition voltage, an indicating circuit having said neon lamp between a first terminal point and a second terminal point and having a first voltage at said first terminal point which is greater than said ignition voltage, said indicating circuit including a second voltage less than first voltage operatively connected to said second terminal point, current limiting means responsive to said first switch for selectively limiting the flow of current between said second voltage and said second terminal point, a first resistance means in parallel with said neon lamp between said first terminal point and said second terminal point, a second resistance means in parallel with said first resistance means between said first terminal point and said second terminal point, first circuit means responsive to said second switch for selectively placing ground at a third terminal point in said first resistance means, and second circuit means responsive to said third switch for selectively placing ground at a fourth terminal point in said second resistance means.

2. The indicating device of claim 1 in which the difference between said first voltage and second voltage is less than the said ignition voltage of said neon lamp.

3. The indicating device of claim 1 in which said current limiting means includes a first circuit between said second voltage and said second terminal point wherein the flow of current toward said second terminal point is prevented, and a second circuit in parallel with said first circuit wherein the flow of current toward said second voltage is prevented.

4. The indicating device of claim 3 in which said first circuit includes a first diode and said second circuit includes a second diode.

5. The indicating device of claim 4 in which said first switch is in series with said second diode and is operative to open and close said second circuit.

6. The indicating device of claim 1 in which said first resistance means includes a first resistor and a second resistor on opposite sides of said third terminal point, and said second resistance means includes a third resistor and a fourth resistor on opposite sides of said fourth terminal point.

7. The indicating device of claim 6 in which said resistors have substantially equal resistance valves.

8. The indicating device of claim 1 in which said second switch is in series between ground and said third terminal point in said first circuit means, and said third switch is in series between ground and said fourth terminal point in said second circuit means.

9. The indicating device of claim 1 including a plurality of said indicating circuits.

10. The indicating device of claim 9 in which at least some of said plurality of indicating circuits have a common second terminal point, a common third terminal point, and a common fourth terminal point.

References Cited

UNITED STATES PATENTS 2,964,680   12/1960   Irvin  ------------ 340—332 X
3,168,728   2/1965   Porath  ---------- 315—135 X JOHN W. CALDWELL, *Primary Examiner.*

CHARLES M. MARMELSTEIN, *Assistant Examiner.*

U.S. Cl. X.R.

315—129, 133, 135; 340—311, 366